US012630297B2

(12) United States Patent
Nourrisson et al.

(10) Patent No.: US 12,630,297 B2
(45) Date of Patent: May 19, 2026

(54) DEVICE FOR CONTROLLING AN ELECTRICAL THRUST REVERSER CONTROL SYSTEM FOR AN AIRCRAFT

(71) Applicant: SAFRAN NACELLES, Gonfreville-l'Orcher (FR)

(72) Inventors: Alain Nourrisson, Moissy Cramayel (FR); Hakim Maalioune, Moissy Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 259 days.

(21) Appl. No.: 18/265,396

(22) PCT Filed: Dec. 6, 2021

(86) PCT No.: PCT/FR2021/052218
§ 371 (c)(1),
(2) Date: Jun. 5, 2023

(87) PCT Pub. No.: WO2022/123163
PCT Pub. Date: Jun. 16, 2022

(65) Prior Publication Data
US 2024/0043129 A1      Feb. 8, 2024

(30) Foreign Application Priority Data
Dec. 11, 2020    (FR) ...................................... 2013117

(51) Int. Cl.
*H02K 7/10*         (2006.01)
*B64D 29/06*        (2006.01)

(52) U.S. Cl.
CPC .......... *B64D 29/06* (2013.01); *B64D 2221/00* (2013.01)

(58) Field of Classification Search
CPC .................................. G05B 9/02; H02P 27/06
See application file for complete search history.

(56) References Cited

U.S. PATENT DOCUMENTS

2013/0206902 A1*   8/2013   Bader ...................... H02J 1/10
                                                                244/76 R
2021/0249979 A1*   8/2021   Dinu ...................... H02P 21/13

FOREIGN PATENT DOCUMENTS

FR        2961177 A1      12/2011
FR        3045837 A1       6/2017
FR        3067121 A1      12/2018

OTHER PUBLICATIONS

International Patent Application No. PCT/FR2021/052218, International Search Report and Written Opinion dated Mar. 14, 2022, 11 pages (9 pages of original document and 2 pages of English translation).

* cited by examiner

*Primary Examiner* — Karen Masih
(74) *Attorney, Agent, or Firm* — Kilpatrick Townsend & Stockton LLP

(57)            ABSTRACT
Said device (16) for controlling an electrical thrust reverser control system (1) for an aircraft comprises electrical supply means (9) and control means (19) which are configured to couple the electrical supply means (9) to the electrical control system (1) when the aircraft is on the ground and to uncouple the electrical supply means (9) from the electrical control system (1) when the aircraft is flying.

8 Claims, 3 Drawing Sheets

Legend:
1 = electrical control system
2 = lock
3 = lock
4 = lock
5 = electromechanical cylinder
6 = electromechanical cylinder
7 = shaft
8 = electrical machine
9 = electrical supply
10 = electrical supply network
11 = electrical energy storage
12 = converter
13 = inverter
14 = control unit
15 = EEC module
16 = control device
17 = data acquisition
18 = computing means
19 = control mean
20 = control unit
120 = voltage booster

[Fig 1]

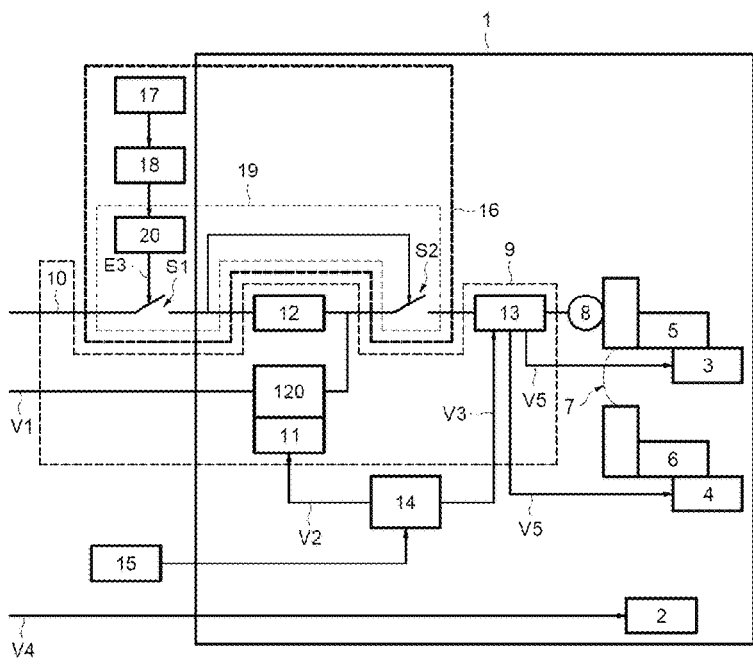

Legend:
1 = electrical control system
2 = lock
3 = lock
4 = lock
5 = electromechanical cylinder
6 = electromechanical cylinder
7 = shaft
8 = electrical machine
9 = electrical supply
10 = electrical supply network
11 = electrical energy storage
12 = converter
13 = inverter
14 = control unit
15 = EEC module
16 = control device
17 = data acquisition
18 = computing means
19 = control mean
20 = control unit
120 = voltage booster

[Fig 2]

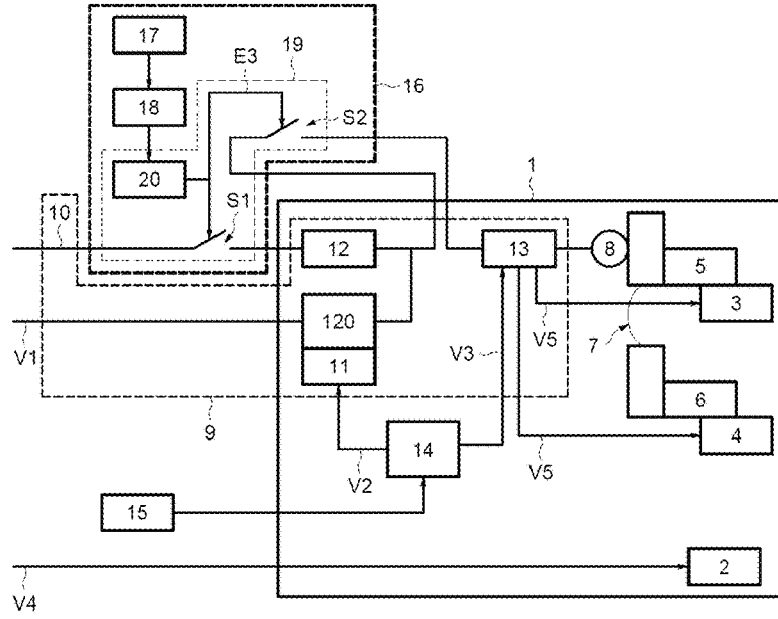

Legend:
1 = electrical control system
2 = lock
3 = lock
4 = lock
5 = electromechanical cylinder
6 = electromechanical cylinder
7 = shaft
8 = electrical machine
9 = electrical supply
10 = electrical supply network
11 = electrical energy storage
12 = converter
13 = inverter
14 = control unit
15 = EEC module
16 = control device
17 = data acquisition
18 = computing means
19 = control mean
20 = control unit
120 = voltage booster

[Fig 3]

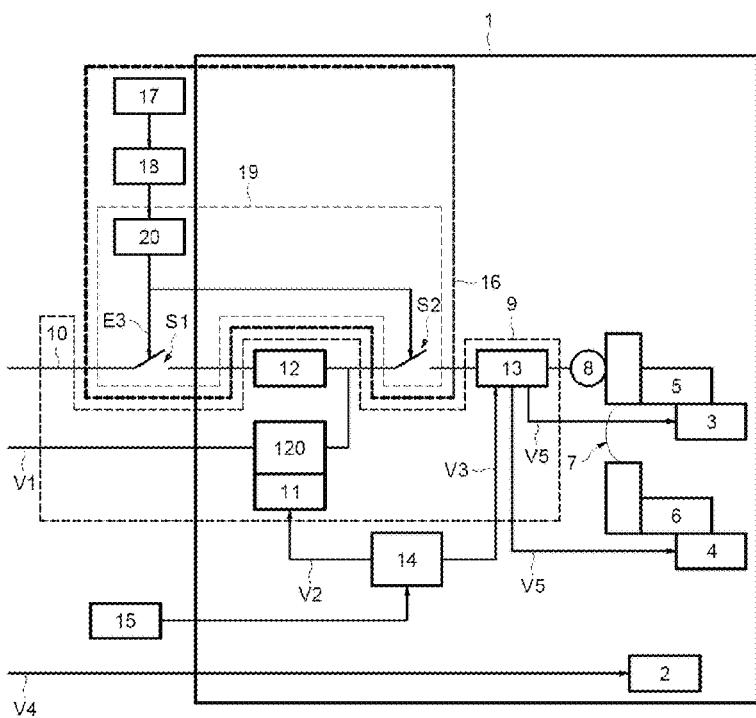

Legend:
1 = electrical control system
2 = lock
3 = lock
4 = lock
5 = electromechanical cylinder
6 = electromechanical cylinder
7 = shaft
8 = electrical machine
9 = electrical supply
10 = electrical supply network
11 = electrical energy storage
12 = converter
13 = inverter
14 = control unit
15 = EEC module
16 = control device
17 = data acquisition
18 = computing means
19 = control mean
20 = control unit
120 = voltage booster

[Fig 4]

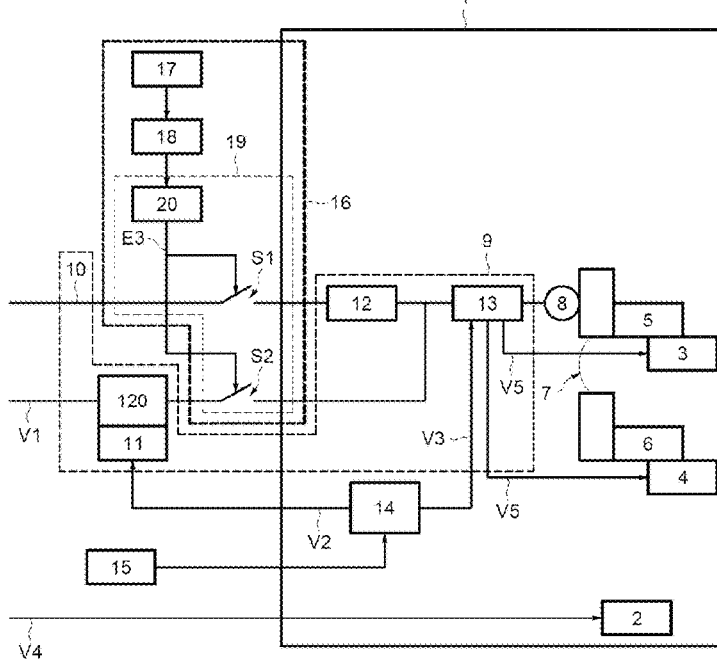

Legend:
1 = electrical control system
2 = lock
3 = lock
4 = lock
5 = electromechanical cylinder
6 = electromechanical cylinder
7 = shaft
8 = electrical machine
9 = electrical supply
10 = electrical supply network
11 = electrical energy storage
12 = converter
13 = inverter
14 = control unit
15 = EEC module
16 = control device
17 = data acquisition
18 = computing means
19 = control mean
20 = control unit
120 = voltage booster

[Fig 5]
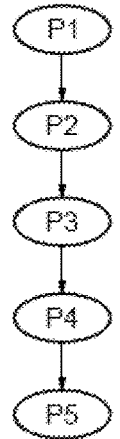
Legend:
P1 = landing phase
P2 = aborted landing
P3 = acquire data relating to
weight of aircraft
P4 = analyze data and indicate
aircraft is flying
P5 = control unit generates
set-point signal
[Fig 6]
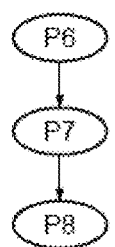
Legend
P6 = acquire data relating to
weight of aircraft
P7 = retrieve data and
indicate that aircraft is on
ground
P8 = control unit generates
set-point signal

DEVICE FOR CONTROLLING AN ELECTRICAL THRUST REVERSER CONTROL SYSTEM FOR AN AIRCRAFT

TECHNICAL FIELD

The present invention relates to aircraft thrust reversers, and relates more specifically to controlling the locking flaps of such thrust reversers.

TECHNICAL FIELD

When an airliner lands, it generally has a high speed between 250 and 300 km/h, which leads to actively stressing the brakes of the wheels of the landing gear and therefore accelerating the wear thereof.

Moreover, when the landing runway is icy, wet or covered in snow, the wheels of the landing gear lose adherence, which can make braking the aircraft difficult.

In order to remedy these constraints, each turbojet engine of the aircraft comprises a plurality of thrust reversers, which have the role, during the landing of the aircraft, of reducing the braking distance thereof by rerouting to the front at least a portion of the thrust generated by the turbojet engine, thus creating the counterthrust intended to help brake the aircraft.

More specifically, the turbojet engine is firstly set to idling speed, in order to enable the aircraft to land, then the speed thereof is subsequently once again increased so that the thrust reversers can generate a sufficient counterthrust.

Thrust reversers generally include a plurality of locking flaps mounted in a hinged manner on a movable cover sliding along rails so as to uncover and conceal cascades capable of redirecting the secondary air flow in the upstream direction of the turbojet engine nacelle when the aircraft is braking.

Generally, the locking flaps are controlled by an electrical control system such as ETRAS® (Electrical Thrust Reverser Actuation System).

More specifically, the electrical control system is intended to control the opening and closing of the locking flaps via a plurality of electromechanical actuators driven by at least one electrical machine.

These electromechanical actuators replace hydraulic actuators in modern aircrafts.

However, it has generally been observed that the torque supplied by the electrical machine results in substantial power consumption in the electrical supply network of the aircraft.

Indeed, these modern electromechanical thrust reversers furthermore require a greater power consumption in the aircraft electrical supply network than hydraulic actuators.

Furthermore, when the aircraft moves in extreme temperature conditions for example −55° C., the electromechanical actuators require the supply, by the electrical machine, of a torque greater than that supplied under normal temperature conditions.

However, current avionic requirements limit the power consumed in the electrical supply network to a power less than the needs of the thrust reverser.

To remedy this drawback, a solution consists of resizing the electrical generator so that it supplies a higher electrical power, so as to supply the power required to drive the electromechanical actuators.

Nevertheless, the supply by the electrical generator of a higher power increases the mass thereof, cost thereof, accelerates the wear thereof and reduces the time between the maintenance thereof.

Furthermore, in order to comply with certification requirements, the resizing of the electrical generator requires performing lengthy and cumbersome test phases prior to the commissioning thereof.

Another solution consists of the use of electrical energy storage means onboard the aircraft, intended to supply a predetermined power to the electrical machine, in addition to the power supplied by the electrical supply network.

However, the integration of the electrical energy storage means onboard the aircraft is liable to result in an undesired power supply of the electrical control system of the thrust reverser in full flight and thus, degrade the aerodynamic performances of the aircraft.

The challenge is therefore that of being able to integrate the electrical energy storage means onboard the aircraft while ensuring the isolation thereof during the flight of the aircraft.

DISCLOSURE OF THE INVENTION

In the light of the above, the invention relates to a method for controlling an electrical thrust reverser control system for an aircraft comprising electrical supply means.

The control method comprises:

a step of coupling the electrical supply means to the electrical control system when the aircraft is on the ground and, a step of uncoupling the electrical supply means from the electrical control system when the aircraft is flying.

The term "electrical control system" denotes any electrically operating system intended to control the opening and closing of the locking flaps of the thrust reverse via a plurality of electromechanical actuators.

In order to comply with avionic requirements, particularly the restriction of the power supplied to the thrust reverser, the supply means are capable of powering the electrical control system such that it can open and close the locking flaps, during the landing of the aircraft for example.

To avoid an untimely supply of the electrical control system in flight and thus comply with avionic certifications, the supply means are electrically isolated from said control system.

For this purpose, data from a sensor commonly referred to as "Weight on Wheels" intended to indicate whether the weight of the aircraft rests on the wheels thereof are acquired.

In other words, it is possible to determine whether the aircraft is flying or on the ground and thus couple the supply means to the control system when the aircraft is on the ground and uncouple them when the aircraft is flying.

Advantageously, the electrical supply means include a three-phase electrical supply network and electrical energy storage means, the step of coupling and the step of uncoupling the supply means comprising a step of generating a set-point signal capable of controlling the closing and opening of a first switch disposed between the three-phase electrical supply network and the electrical control system and capable of controlling the closing and opening of a second switch coupled with the supply means.

The three-phase electrical supply network is intended to supply an AC electrical voltage between 115 and 200 Volts, only when the aircraft is on the ground.

As regards the electrical energy storage means, they are capable of supplying the electrical control system with an electrical voltage between 270 and 540 Volts for example.

Thus, the power supplied by the electrical energy storage means, in addition to the power supplied by the electrical supply network, makes it possible to generate a sufficient torque for opening and closing the locking flaps.

Furthermore, it should be noted that by limiting the withdrawal of energy on the three-phase electrical supply network, it is possible to reduce the cross-section of the cables connecting the electrical supply network and the electrical control system, which represents a non-negligible gain of mass.

Alternatively, the storage means can supply all the power required for opening and closing the locking flaps.

Preferably, the set-point signal simultaneously controls the first and the second switch.

Simultaneously controlling the two switches makes it possible to implement the coupling and uncoupling of the supply means of the electrical control system more quickly.

For example, in the case of rejected take-off, it is advantageous to open the locking flaps of the thrust reverser quickly and therefore couple the supply means to the electrical control system.

Similarly, in the case of aborted landing, there is an urgent need to reclose the locking flaps, then uncouple the supply means from the control system so that the aircraft can land again.

The invention also relates to a device for controlling an electrical thrust reverser control system for an aircraft comprising electrical supply means.

The device comprises control means configured to couple the electrical supply means to the electrical control system when the aircraft is on the ground and uncouple the electrical supply means from the electrical control system when the aircraft is flying.

Advantageously, the electrical supply means include a three-phase electrical supply network and electrical energy storage means, the control means including a first switch disposed between the three-phase electrical supply network and the electrical control system, and a second switch coupled to the supply means, the control means being configured to generate a set-point signal capable of controlling the closing and opening of the first switch and the second switch.

Preferably, the set-point signal is capable of simultaneously controlling the first and the second switch.

Preferably, the device comprises a DC voltage source capable of powering the electrical energy storage means.

The DC voltage source is capable of distributing a voltage of 28 Volts to 150 Volts for example to the electrical energy storage means when the aircraft is on the ground and/or flying.

Advantageously, the storage means comprise a plurality of supercapacitors or batteries.

The batteries can be Nickel Cadmium (Ni-Cd), Nickel-Metal Hydride (Ni-MH), Lithium-Ion or Lithium Polymer batteries.

As regards supercapacitors, they are disposed so as to have a capacitance between around ten and two hundred Farad.

Preferably, the first and the second switches are contactors.

To avoid degradation of the device and/or the electrical control system, it is advantageous to use contactor type switches in order to withstand the flow of substantial currents.

The invention furthermore relates to an aircraft comprising electrical supply means and at least two thrust reversers each comprising an electrical control system controlled by a control device as defined above.

BRIEF DESCRIPTION OF THE DRAWINGS

Other aims, features and advantages of the invention will appear upon reading the following description, given only as a non-limiting example, and made with reference to the appended drawings wherein:

FIG. 1 to FIG. 4 represent different alternative architectures of a device for controlling an electrical thrust reverser control system, according to the invention;

FIG. 5 illustrates a first flow chart of a method for controlling the electrical control system, implemented by said device, according to a first implementation of the invention and, FIG. 6 illustrates a second flow chart of a method for controlling the electrical control system, implemented by said device, according to a second implementation of the invention.

DETAILED DISCLOSURE OF AT LEAST ONE EMBODIMENT OF THE INVENTION

In FIG. 1, the general architecture of an electrical thrust reverser control system, designated with the general reference number 1, has been represented.

The electrical control system 1 is intended to control the opening and the closing of the thrust reverser while preventing the sliding movement of the locking flaps of the thrust reverser from occurring in an untimely manner in full flight.

For this purpose, the electrical control system 1 comprises a plurality of safety locks 2, 3, 4 intended to impede the undesired opening of the locking flaps.

The two locks 3 and 4 are referred to as primary and the third lock 2 is of tertiary type, each lock being intended to take up the loads of the locking flaps in the event of failure of the two other locks.

Moreover, it should be noted that the locks 2, 3, 4 can be of brake type, motorized type or electromechanical type.

The electrical control system 1 furthermore comprises a plurality of electromechanical actuators 5 and 6, here two cylinders 5 and 6, intended to open and close the locking flaps.

For example, the primary cylinder 3 is associated with the electromechanical cylinder 5, and the primary lock 4 is associated with the electromechanical cylinder 6.

As regards the tertiary lock 2, it is here controlled by a signal V4 supplied from a thrust reversal controller capable to being actuated by the aircraft pilot and not shown here.

In order to ensure a synchronized movement of the electromechanical actuators 5 and 6, the electrical control system 1 comprises a flexible shaft 7 configured to connect the electromechanical actuators 5 and 6 to each other.

The flexible shaft 7 is moreover coupled with a reversible electrical machine 8 intended to drive the electromechanical actuators 5 and 6.

Obviously, the electrical control system 1 can comprise a plurality of flexible shafts 7 as well as a plurality of electromechanical actuators.

The electrical machine 8 operates here in motor mode and therefore produces a mechanical energy from an electrical energy.

To supply the electrical machine 8 with electrical energy, the aircraft comprises electrical supply means 9 coupled to the electrical control system 1.

More specifically, the electrical supply means 9 include a three-phase electrical supply network 10 capable of supplying an AC electrical voltage between 115 and 200 Volts.

The electrical supply means 9 furthermore include electrical energy storage means 11 capable of supplying a DC voltage between 270 and 540 Volts.

For example, the electrical energy storage means 11 comprise a plurality of supercapacitors or a plurality of batteries.

When the storage means include supercapacitors, they can be disposed so as to have a capacitance between around ten and two hundred Farad.

Moreover, the storage means 11 are coupled with a reversible voltage booster 120 configured to receive a DC voltage from a DC voltage source V1 equal to 28 Volts and thus, amplify it up to 270 Volts or 540 Volts.

The DC voltage from the storage means 11 is then coupled to the voltage from the electrical supply network 10.

For this purpose, the supply means 9 comprise a voltage converter 12 capable of converting a three-phase AC voltage, for example of 115 Volts, into a DC voltage of 270 Volts.

As a voltage converter 12, mention can be made of ATRU® (Auto Transformer Rectifier Unit).

The supply means 9 further include an inverter 13 coupled to the voltage converter 12 and to the voltage booster 120.

The inverter 13 is configured to convert the DC electrical voltage, from the voltage converter 12 and the voltage booster 120, into AC voltage.

Thus, it is possible to use the voltage supplied by the storage means 11 and the electrical supply network 10 to supply a predetermined power to the electrical machine 8.

In other words, the supply means 9 are capable of supplying the power required by the thrust reverser to open and close the locking flaps, while complying with avionic certifications in respect of the restriction of the withdrawal of electrical energy on the electrical supply network 10 of the aircraft.

The inverter 13 is furthermore configured to power the primary locks 3 and 4. For this purpose, the inverter 13 supplies a signal V5 to the two locks 3 and 4.

Moreover, it should be noted that the electrical control system 1 comprises a control unit 14 coupled to the storage means 11 and to the inverter 13.

More specifically, the control unit 14 is configured to supply a first control signal V2 to the storage means 11 in order to allow the power supply thereof by the voltage booster 120 when the aircraft is flying, during the aircraft descent phase for example.

However, the control unit 14 is furthermore configured to supply the first control signal V2 to the storage means 11 in order to discharge them, for example when the aircraft is in the cruise phase, which provides an additional guarantee of safety in respect of the untimely opening of the locking flaps of the thrust reverser in full flight.

Furthermore, the control unit 14 is also configured to supply a second control signal V3 to the inverter 13 to define the frequency of the AC voltage intended to power the electrical machine 8.

It should be noted that the control unit 14 is controlled by an electronic engine control (EEC) module 15.

In order to isolate the supply means 9 from the electrical control system 1 in flight so as not to supply said electrical system 1 with electrical energy, the electrical control system

1 is coupled to a control device 16 comprising data acquisition means 17, computing means 18 as well as control means 19.

More specifically, the data acquisition means 17 are configured to receive data relating to the weight of the aircraft.

For example, the data acquisition means 17 retrieve data from a sensor commonly referred to as "Weight on Wheels" which indicates whether the weight of the aircraft rests on the wheels thereof.

Regarding the computing means 18, they are coupled to the acquisition means 17 and are configured to determine, from the data supplied by the acquisition means 17, whether the aircraft is flying or on the ground.

Consequently, when the aircraft is on the ground, the computing means 18 are configured to activate the control means 19 which are configured to couple the supply means 9 to the control system 1, when the aircraft is on the ground, or isolate them once the aircraft is flying.

More specifically, the control means 19 include a first switch S1, coupled to the voltage converter 12 and disposed between the three-phase electrical supply network 11 and the electrical control system 1.

The control means 19 furthermore include a second switch S2 disposed between the supply means 9 and the voltage converter 12.

In other words, the control device 16 is embedded partially inside the electrical control system 1.

To control the first switch S1 and the second switch S2, the control means 19 include a control unit 20 configured to generate a set-point signal E3 capable of actuating the first switch S1 which controls, in turn, the second switch S2.

Reference is made to FIG. 2 which illustrates an alternative architecture of the control device 16.

In this example, the first switch S1 and the second switch S2 are isolated from the electrical control system 1, which makes it possible to ensure the integrity thereof in event of incidents occurring in the circuit of the electrical control system 1.

Each switch S1, S2, of contactor type, is configured to simultaneously receive the set-point signal E3.

Thus, in the case of rejected take-off, the power supply of the thrust reversers can start more quickly.

Alternatively and as illustrated in FIG. 3, the second switch S2 is disposed inside the electrical control system 1 and more specifically between the voltage booster 120 and the converter 12.

The second switch S2 is here coupled to the inverter 13 and is controlled by the set-point signal E3.

FIG. 4 illustrates another variant of the architecture of the control device 16.

In this embodiment, the first and the second switches S1, S2 are disposed outside the electrical control system 1 and are controlled simultaneously by the set-point signal E3 from the control unit 20.

Moreover, the voltage booster 120 and the storage means 11 are also located outside the electrical control system 1 so as to distance them sufficiently from said electrical control system 1 when the latter is subject to short-circuits and thus, preserve the integrity thereof.

Reference is made to FIG. 5 which illustrates a first flow chart of a method for controlling the electrical control system 1, implemented by said device 16.

The method starts with a step P1 during which the aircraft is in the landing phase.

Once the aircraft is on the ground, the locking flaps of each thrust reverser of the aircraft are opened to generate counterthrust and thus slow down the aircraft.

Thus, each thrust reverser is powered both by the three-phase electrical supply network 10 and the storage means 11.

Once the flaps are fully open, the control unit 20 generates the set-point signal E3 to close the first switch S1 and thus enables the electrical supply network 10 to charge the storage means 11.

However, during the step P2, following an aborted landing, the pilot actuates the thrust reversal controller to urgently close the locking flaps of each thrust reverser. The aircraft is once again flying.

In order to prevent a sliding movement of the locking flaps of the thrust reverser from occurring in an untimely manner in flight, the data acquisition means 17 acquire, during step P3, the data relating to the weight of the aircraft and sends the data to the computing means 18.

In step P4, the computing means 18 indicate to the control means 19 that the aircraft is flying, after analyzing the data received by the acquisition means 17.

Consequently, the control unit 20 generates, in the next step P5, the set-point signal E3 in order to simultaneously open the two switches S1 and S2 if the two switches are disposed in an architecture as illustrated in FIGS. 2, 3 and 4.

Following the opening of the two switches S1 and S2, the control unit 14 supplies the first control signal V2 to the storage means 11 in order to discharge them.

During the descent of the aircraft to attempt another landing, the control unit 14 supplies the first control signal V2 in order to allow the supply of the storage means 11 by the DC voltage source V1.

Alternatively, when the two switches are disposed in the control device 16 according to the architecture illustrated in FIG. 1, the first switch controls the second switch S2.

The voltage converter 12 is now isolated from the supply means 9.

In other words, the electrical supply means 9 are decoupled from the electrical control system 1.

With reference to FIG. 6, when an aircraft stops its take-off, it is advantageous to deploy the thrust reversers in order to slow down the aircraft then enable the aircraft to take off once again when the required conditions are met.

In this case, the acquisition means 17 acquire, during step P6, data relating to the weight of the aircraft.

In step P7, the computing means 18 retrieve the data from the acquisition means 17 and indicate to the control unit 20 that the aircraft is on the ground.

During the next step P8, the control unit 20 generates the set-point signal E3 intended to close the first switch S1 and the second switch S2 simultaneously or successively according to the architecture of the control device 16 used, which makes it possible to couple the electrical supply means 9 to the control system 1 and thus power the electrical machine 8.

Moreover, it should be noted that if the storage means 11 have not been fully charged by the DC voltage source V1, for example, following a reduced aircraft taxiing phase, a rapid supply of the storage means 11 can be implemented by the three-phase electrical supply network 10, the voltage converter 12 and the reversible voltage booster 120 upon the closing of the first switch S1.

Thus, the control unit 14 is configured to ensure, during the entire flight travelled by the aircraft, that the opening and closing of the locking flaps can be implemented by limiting the power withdrawal on the electrical supply network of the aircraft 10.

For this purpose, the control unit 14 allows the supply of the storage means 11 by the electrical supply network 10 before controlling the thrust reverser or by the DC voltage source V1 during the aircraft taxiing, flight or descent phases.

The invention claimed is:

1. Method for controlling an electrical control system for an aircraft, characterized in that the method comprises:
   a step of coupling electrical supply means to the electrical control system when the aircraft is on a ground, wherein the electrical supply means comprises a three-phase electrical supply network and energy storage means; and,
   a step of uncoupling the electrical supply means from the electrical control system when the aircraft is flying, the step of coupling and the step of uncoupling the supply means comprising a step of generating a set-point signal (E3) capable of controlling closing and opening of a first switch (S1) disposed between the three-phase electrical supply network and the electrical control system and capable of controlling closing and opening of a second switch (S2) coupled with the supply means.

2. Method according to claim 1, wherein the set-point signal (E3) simultaneously controls the first and the second switch (S1, S2).

3. Device for controlling an electrical control system for an aircraft comprising electrical supply means, wherein the device comprises control means configured to:
   couple the electrical supply means to the electrical control system when the aircraft is on the ground, wherein the electrical supply means comprises a three-phase electrical supply network and electrical energy storage means, and,
   uncouple the electrical supply means from the electrical control system when the aircraft is flying, the control means including a first switch (S1) disposed between the three-phase electrical supply network and the electrical control system, and a second switch (S2) coupled to the supply means, the control means being configured to generate a set-point signal (E3) capable of controlling the closing and opening of the first switch (S1) and the second switch (S2).

4. Device according to claim 2, wherein the set-point signal (E3) is capable of simultaneously controlling the first and the second switch (S1, S2).

5. Device according to claim 3, comprising a DC voltage source (V3) capable of powering the electrical energy storage means.

6. Device according to claim 3, wherein the storage means comprise a plurality of supercapacitors or batteries.

7. Device according to claim 3, wherein the first and the second switch (S1, S2) are contactors.

8. Aircraft comprising electrical supply means and at least two thrust reversers each comprising an electrical control system controlled by a device according to claim 3.

* * * * *